(12) United States Patent
Tanai

(10) Patent No.: US 6,782,045 B1
(45) Date of Patent: Aug. 24, 2004

(54) FREQUENCY ERROR MEASURING METHOD AND FREQUENCY ERROR MEASURING DEVICE

(75) Inventor: Masaharu Tanai, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 408 days.

(21) Appl. No.: 09/640,240

(22) Filed: Aug. 16, 2000

(30) Foreign Application Priority Data

Aug. 26, 1999 (JP) ........................................ P. 11-240359

(51) Int. Cl.[7] .......................... H04B 17/00; H04B 3/46; H04Q 1/20
(52) U.S. Cl. ...................................... 375/224; 708/309
(58) Field of Search ................................. 375/224, 226, 375/375, 371, 332, 329, 344, 279, 281; 708/309; 329/304; 455/226.1; 324/76.11, 76.19, 76.22

(56) References Cited

U.S. PATENT DOCUMENTS

| | | | | | |
|---|---|---|---|---|---|
| 5,099,243 A | * | 3/1992 | Tsui et al. | ............... | 324/76.47 |
| 5,179,344 A | * | 1/1993 | Najle et al. | ............... | 324/613 |
| 5,612,977 A | * | 3/1997 | Ogoro | ........................ | 375/344 |
| 5,966,405 A | * | 10/1999 | Tanai | ........................ | 375/224 |
| 6,308,065 B1 | * | 10/2001 | Molinari et al. | ............ | 455/424 |

* cited by examiner

*Primary Examiner*—Jean B. Corrielus
(74) *Attorney, Agent, or Firm*—Fish & Richardson P.C.

(57) ABSTRACT

In a frequency spectrum analyzer (2) which receives a modulation signal previously measures the frequency (F). A synchronous detection frequency (B) is determined on the basis of the frequency (F). An adder (7) obtains the difference (G) between the synchronous detection frequency (B) and the reference frequency (C). From an I signal and a Q signal which are obtained by performing synchronous detection by using the synchronous detection frequency (B), a frequency error detector (6) obtains a frequency error (E) by the phase trajectory method. An adder (8) adds the difference (G) and the frequency error (E) to obtain a frequency error.

23 Claims, 2 Drawing Sheets

CONVENTIONAL MEASUREMENT RANGE

MEASUREMENT RANGE OF THE INVENTION

F0: FREQUENCY DEFINED BY SYSTEM
Ft: TRANSMISSION RATE
$\alpha = (1/10) \times Ft$
F'1, F1": LOCAL FREQUENCIES

FREQUENCY ERROR MEASURING METHOD AND FREQUENCY ERROR MEASURING DEVICE

BACKGROUND OF THE INVENTION

1. Field of the Invention

The present invention relates to a frequency error measuring method and a frequency error measuring device which are preferably used for measuring a frequency error of a communication waveform in a mobile communication apparatus compatible with a digital communication system.

2. Description of the Related Art

Recently, with the advance of mobile communication techniques, the number of persons carrying a mobile communication apparatus such as a portable telephone is rapidly increasing. In conventional mobile communications, the radio frequency band is defined depending on the kind of the mobile communication system (analog or digital system). The number of channels which can be simultaneously used in communications is set in accordance with the defined radio frequency band.

In recent mobile communication systems, a digital system in which many channels can be efficiently set even in the same radio frequency band is mainly employed. A portable telephone and a portable information communication apparatus having a mobile communication function which are compatible with such a digital mobile communication system, are widely used.

As a digital communication system, for example, employed is the TDMA (Time Division Multiple Access) system, or recently the CDMA (Code Division Multiple Access) system. In a communication device of such a digital system, measurement items include a measurement of a frequency error.

As a conventional method of obtaining a frequency error, known is the phase trajectory method. In the phase trajectory method, a frequency error is obtained from a time-varying deviation between the phase variation of an input signal and that of an ideal phase component.

Conventionally, a phase detector is used as an apparatus for obtaining a frequency error based on the phase trajectory method. Such a phase detector is configured so that the phases of I and Q components of a synchronous-detected input signal are detected, and a result of a frequency error calculation is output by the phase trajectory method in which a frequency error is obtained from differences between the phases and a reference phase difference.

When a frequency error of a π/4-shift QPSK modulation signal is to be measured in a conventional system, for example, the measurement range of a frequency error is only about 1/10 of the transmission rate. When a signal contains a frequency corresponding to 1/10 of the transmission rate, therefore, a phase component corresponding to the frequency is added, a symbol point is erroneously detected, and hence a phase difference cannot be correctly obtained, thereby producing a problem in that the measurement accuracy of a frequency error is impaired.

SUMMARY OF THE INVENTION

It is an object of the invention to provide a frequency error measuring device in which, even when a frequency error is equal to or greater than 1/10 of the transmission rate, the measurement accuracy can be improved.

According to the invention, the object can be attained by employing the following means.

1. A rough frequency of an input modulation signal which is to be measured is obtained by frequency spectrum analyzing means; a predetermined synchronous detection frequency is determined on the basis of the rough frequency; a difference between the synchronous detection frequency and a reference signal is obtained; an I signal and a Q signal are obtained by performing synchronous detection by using the synchronous detection frequency; a frequency error is obtained from the I component and the Q component by a phase trajectory method; and the frequency error is added to the difference, whereby a final frequency error value can be obtained (first aspect of the invention).

2. A rough frequency of an input modulation signal which is to be measured is obtained by frequency spectrum analyzing means; the rough frequency is compared with predetermined upper and lower limit values, and one of plural predetermined synchronous detection frequencies is determined on the basis of a result of the comparison; a difference between the synchronous detection frequency and a reference signal is obtained; an I signal and a Q signal are obtained by performing synchronous detection by using the synchronous detection frequency; a frequency error is obtained from the I component and the Q component by a phase trajectory method; and the frequency error is added to the difference to obtain a final frequency error value (second aspect of the invention).

3. A rough frequency of an input modulation signal which is to be measured is obtained by frequency spectrum analyzing means; the rough frequency is compared with predetermined upper and lower limit values, and one of plural predetermined synchronous detection frequencies is determined on the basis of a result of the comparison; an I signal and a Q signal are obtained by performing synchronous detection by using a sampling data and the synchronous detection frequency, the sampling data being obtained by sampling the modulation signal; a phase data is calculated from the I component and the Q component, and a frequency error is obtained by a phase trajectory method; a difference between the synchronous detection frequency and a reference signal is obtained; and the frequency error is added to the difference; whereby a final frequency error value can be obtained (third aspect of the invention).

4. A rough frequency of an input modulation signal which is to be measured is obtained by frequency spectrum analyzing means; a range in which the rough frequency exists is judged with respect to predetermined upper and lower limit values, a synchronous detection frequency in the case where the frequency is lower than the lower limit value is determined, a synchronous detection frequency in the case where the frequency is higher than the upper limit value is determined, or a synchronous detection frequency in the case where the frequency is between the upper and lower limit values is determined; detection is performed by using a sampling data and the synchronous detection frequency, at a timing of the synchronous detection, thereby obtaining an I signal and a Q signal of the synchronous-detected input signal, the sampling data being obtained by sampling the modulation signal; a phase data is extracted from the I component and the Q component by an atan (arctangent) calculation, and then subjected to a predetermined normalization process, and a frequency error is thereafter obtained by a phase trajectory method from a difference between the phase data and an ideal phase shift point; a difference between the synchronous detection frequency and a reference signal is obtained; and the frequency error is added to the difference; whereby a final frequency error value can be obtained (fourth aspect of the invention).

5. Also in the case where, in the first to fourth aspects of the invention, the frequency spectrum analyzing means is a sweeping spectrum analyzer, a final frequency error value can be obtained (fifth aspect of the invention).

6. Also in the case where, in the first to fourth aspects of the invention, the frequency spectrum analyzing means is an FFT spectrum analyzer, a final frequency error value can be obtained (sixth aspect of the invention).

7. When the means of the first to sixth aspects of the invention is employed, also in the case where the input modulation signal which is to be measured is a $\pi/4$-shift QPSK modulation signal, a final frequency error value can be obtained (seventh aspect of the invention).

8. The device is configured by: a frequency spectrum analyzer which obtains a rough frequency of an input modulation signal which is to be measured; a judging section which determines one of plural predetermined synchronous detection frequencies on the basis of the rough frequency; an adder which obtains a difference between the synchronous detection frequency and a reference signal; a quasi-synchronous detector which performs synchronous detection by using the synchronous detection frequency to output an I signal and a Q signal; a frequency error detector which obtains a frequency error from the I component and the Q component by a phase trajectory method; and an adder which adds the frequency error and the difference (eighth aspect of the invention).

9. The device is configured by: a frequency spectrum analyzer which obtains a rough frequency of an input modulation signal which is to be measured; a judging section which performs judgment on the rough frequency to determine a frequency that is to be subjected to synchronous detection; a sampling data memory which stores the modulation signal to be measured; a quasi-synchronous detector which performs synchronous detection on the modulation signal which is to be measured, by using the frequency which is determined by the judging section; a frequency error detector which calculates phase data from components of the synchronous-detected signal, and which obtains a frequency error from a phase difference between the phase data by a phase trajectory method; and an adder which obtains a difference between the synchronous-detected frequency and a reference frequency, and which adds a measurement result of the frequency error detector to the difference (ninth aspect of the invention).

10. The device is configured by: a frequency spectrum analyzer which obtains a rough frequency of an input modulation signal which is to be measured; a judging section which compares the rough frequency with predetermined upper and lower limit values, and which determines one of plural synchronous detection frequencies on the basis of a result of the comparison; an adder which calculates a difference between the frequency and a reference signal; a quasi-synchronous detector which performs synchronous detection by using the synchronous detection frequency to output an I signal and a Q signal; a frequency error detector which obtains a frequency error from the I component and the Q component by a phase trajectory method; and an adder which adds the frequency error and the difference (tenth aspect of the invention).

11. The device is configured by: a frequency spectrum analyzer which obtains a rough frequency of an input modulation signal which is to be measured; a judging section which compares the rough frequency with predetermined upper and lower limit values, and which determines one of plural synchronous detection frequencies on the basis of a result of the comparison; an adder which calculates a difference between the synchronous detection frequency and a reference signal; a quasi-synchronous detector which performs synchronous detection by using a sampling data and the synchronous detection frequency to output an I signal and a Q signal, the sampling data being obtained by sampling the modulation signal; a frequency error detector which calculates a phase data from the I component and the Q component, and which obtains a frequency error (E) by a phase trajectory method; and an adder which adds the frequency error and the difference (twelfth aspect of the invention).

12. The device is configured by: a frequency spectrum analyzer which obtains a rough frequency of an input modulation signal which is to be measured; a judging section which judges a range in which the rough frequency exists, with respect to predetermined upper and lower limit values, and which determines a synchronous detection frequency in the case where the frequency is lower than the lower limit value, a synchronous detection frequency in the case where the frequency is higher than the upper limit value, or a synchronous detection frequency in the case where the frequency is between the upper and lower limit values; an adder which obtains a difference between the synchronous detection frequency and a reference signal; a quasi-synchronous detector which performs synchronous detection by using a sampling data and the synchronous detection frequency, at a timing of the synchronous detection, and which outputs an I signal and a Q signal of the synchronous-detected signal, the sampling data being obtained by sampling the modulation signal; a frequency error detector which extracts a phase data from the I component and the Q component by an atan (arctangent) calculation, which performs a predetermined normalization process, and obtains a frequency error by a phase trajectory method from a difference between the phase data and an ideal phase shift point; and an adder which adds the frequency error to the difference (fourteenth aspect of the invention).

13. The device is configured by the means of the eighth to twelfth aspects of the invention, and a sampling data memory which stores the modulation signal to be measured (eleventh, thirteenth, and fifteenth aspects of the invention).

14. When the means of the eighth to thirteenth aspects of the invention is employed, also in the case where the input modulation signal which is to be measured is a $\pi/4$-shift QPSK modulation signal, a final frequency error value can be obtained (sixteenth aspect of the invention).

15. In the means of the eighth to twelfth aspects of the invention, the frequency spectrum analyzer is a sweeping spectrum analyzer (seventeenth aspect of the invention).

16. In the means of the eighth to twelfth aspects of the invention, the frequency spectrum analyzer is an FFT spectrum analyzer (eighteenth aspect of the invention).

17. In a frequency error detector of the conventional art and using the phase trajectory method, only a frequency error corresponding to about 1/10 of the transmission rate about the local frequency to be subjected to synchronous detection can be obtained at the maximum. By contrast, the frequency error measuring device which performs synchronous detection on signal components contained in an input modulation signal to be measured, calculates a phase data from the synchronous-detected signal components, detects a phase difference between the phase data, and obtains a frequency error by the phase trajectory method is characterized in that the frequency of the input modulation signal is roughly obtained in advance by a frequency spectrum analyzer 2, and the local frequency can be changed to a range where a measurement by the phase trajectory method is enabled.

18. The frequency of an input modulation signal is roughly obtained by a frequency spectrum analyzer 2, and the frequency result is supplied to a judging section 3. The frequency B of synchronous detection is determined by a judging circuit included in a frequency detector. By using the synchronous detection frequency B which is determined by the judging section 3, synchronous detection is performed on a modulation signal A which is to be measured and which is input into a quasi-synchronous detector 5, and I and Q components D are output.

The device is characterized in that, the I and Q components D are input into a frequency error detector 6. In the frequency error detector 6, phase components are extracted, and a frequency error E is obtained by the phase trajectory method. In an adder 8, the obtained frequency error E is added to the difference between the synchronous detection frequency B which is determined by the judging section 3, and a reference frequency, thereby obtaining the correct frequency error of the modulation signal A to be measured.

19. The invention is characterized in that the rough synchronous detection frequency B is rapidly obtained by the frequency spectrum analyzer 2 (first to eighteenth aspect of the invention).

DETAILED DESCRIPTION OF THE PRESENT INVENTION

Hereinafter, an embodiment of the invention will be described in detail with reference to the accompanying drawings.

Figure 1:
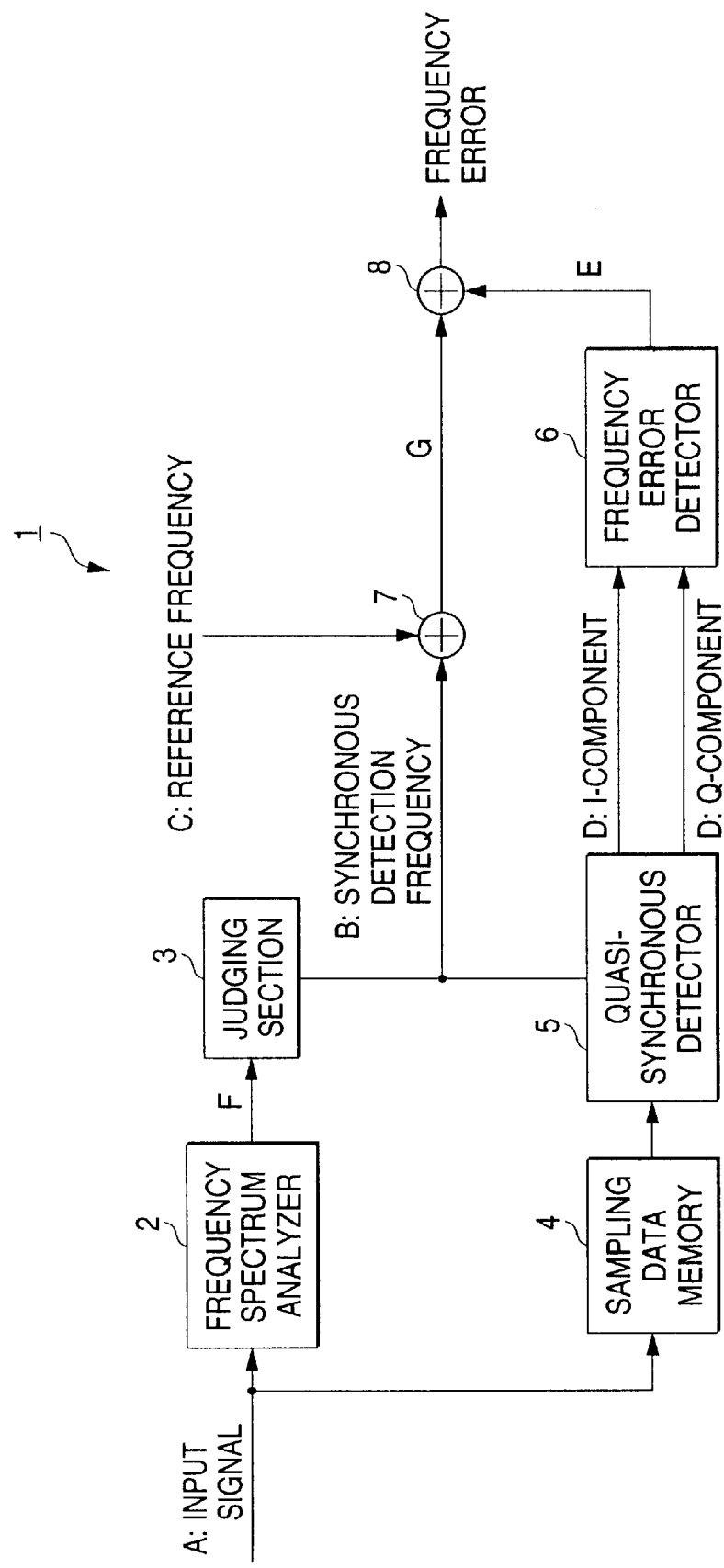
FIG. 1 is a block diagram showing the configuration of main portions of an embodiment of the invention.

FIG. 1 is a diagram showing an embodiment of a frequency error measuring device to which the invention is applied. First, the configuration of the embodiment will be described.

FIG. 1 is a block diagram showing the configuration of main portions of the frequency error measuring device of the embodiment.

Referring to FIG. 1, the frequency error measuring device is configured by a frequency spectrum analyzer 2, a judging section 3, a sampling data memory 4, a quasi-synchronous detector 5, a frequency error detector 6, an adder 7, and an adder 8.

In the frequency spectrum analyzer 2, a modulation signal ($\pi$/4-shift QPSK modulation signal) output from a $\pi$/4-shift QPSK modulator in a communication system which is outside of the figure and not shown, and which is compatible with the $\pi$/4-shift QPSK modulation system is input into a sweeping spectrum analyzer or an FFT spectrum analyzer. The center frequency which is obtained from the frequency spectrum is output to the judging section 3.

At this time, with respect to the input signal, it is assumed that communication is being performed. During communication, 1/0 are randomly transmitted. Therefore, the frequency can be roughly specified at a certain degree although it is varied depending on the generation pattern of 1/0.

The judging section 3 judges whether the frequency value supplied from the frequency spectrum analyzer 2 exceeds criterion frequencies (upper and lower limit values) or not, and then outputs a predetermined synchronous frequency to the quasi-synchronous detector 5 and the adder 7.

The sampling data memory 4 is configured by a semiconductor memory such as a RAM. The memory has a capacity which allows sampling data to be stored in the sequence corresponding to the input sequence. The sampling data are obtained by sampling at a predetermined sampling timing a modulation signal ($\pi$/4-shift QPSK modulation signal) output from a $\pi$/4-shift QPSK modulator in a communication system which is outside of the figure and not shown, and which is compatible with the $\pi$/4-shift QPSK modulation system. In response to a read request from the quasi-synchronous detector 5, the sampling data are read out from the memory in the storing sequence, and then output to the quasi-synchronous detector 5.

By using the frequency supplied from the judging section 3, the quasi-synchronous detector 5 performs a detecting operation on the sampling data at the synchronous detection timing. The I signal and the Q signal of the synchronous-detected input signal are output to the frequency error detector 6.

The frequency error detector 6 extracts a phase data by an atan (arctangent) calculation, from the I component and the Q component which are supplied from the quasi-synchronous detector 5, performs a predetermined normalization process on the components, and then outputs a frequency error which is obtained by the phase trajectory method from the difference between the phase data and an ideal phase shift point.

The adder 7 performs addition (or subtraction) on the frequency received from the judging section 3, and the reference frequency which is defined in the communication system, and outputs a deviation with respect to the frequency which is designated by the synchronous detector 5.

The adder 8 adds the value which is produced as a deviation by the adder 7 from the frequency which is roughly obtained by the frequency spectrum analyzer 2, and the correct frequency error from the synchronous frequency and obtained by the frequency error detector 6, and then outputs a frequency error as a measurement result.

Next, the operation of the embodiment will be described.

Referring to FIG. 1, an input signal (sampling data) is input into the frequency spectrum analyzer 2 and the sampling data memory. The input signal is obtained by sampling at a predetermined sampling timing the modulation signal ($\pi$/4-shift QPSK modulation signal) output from the $\pi$/4-shift QPSK modulator in the communication system which is outside of the figure, and which is compatible with the $\pi$/4-shift QPSK modulation system. Then, the frequency spectrum analyzer 2 performs Fourier transformation (FFT: Fast Fourier Transformation) on the sampling data to obtain a frequency spectrum.

The center frequency of the frequency spectrum is obtained in the following manner. The total sum of spectra in the band which is about three or more times the transmission rate about the reference frequency is obtained. The total sum is set as the total power. The frequency which is on the lower frequency side with respect to the maximum frequency of the band, and at which the power is 0.5% of the total power is set as the upper limit frequency, and that which is on the higher frequency side with respect to the minimum frequency of the band, and at which the power is 0.5% of the total power is set as the lower limit frequency. Thereafter, (the upper limit frequency+the lower limit frequency)/2 is set as the center frequency. The center frequency is output to the judging section 3.

In accordance with the measurement range of the frequency error detector, the judging section 3 previously calculates the upper limit value, the lower limit value, a synchronous detection frequency (B1) in the case where the input frequency is lower than the lower limit value, a synchronous detection frequency (B2) in the case where the frequency is higher than the upper limit value, and a synchronous detection frequency (B3) in the case where the frequency is between the upper and lower limit values. Then, the judging section 3 judges the frequency which is input from the frequency spectrum analyzer 2, with respect to the criterion values, and then outputs a synchronous detection frequency (B).

Next, the quasi-synchronous detector 5 sequentially reads out the data stored in the sampling data memory 4, and, by using the frequency supplied from the judging section 3, performs a detecting operation on the sampling data at the synchronous detection timing. The I signal and the Q signal of the synchronous-detected input signal are output to the frequency error detector 6.

Thereafter, the frequency error detector 6 extracts a phase data by an atan (arctangent) calculation, from the I component and the Q component which are supplied from the quasi-synchronous detector 5, performs the predetermined normalization process on the components, and then outputs a frequency error which is obtained by the phase trajectory method from the difference between the phase data and the ideal phase shift point.

The adder 7 then performs addition (or subtraction) on the frequency received from the judging section 3, and the reference frequency which is defined in the communication system, and outputs a deviation with respect to the frequency which is designated by the synchronous detector 5.

Finally, the adder 8 adds the frequency error (the output of the adder 7) which is obtained by the frequency spectrum analyzer 2, and the frequency error which is obtained by the frequency error detector 6, thereby obtaining a final frequency error value.

Figure 2A:
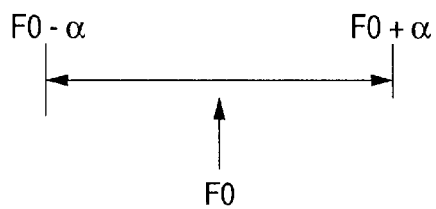
FIG. 2A is a diagram illustrating the principle of widening of the measurement range of the conventional art.

In the above-described method of the conventional art, as shown in FIG. 2A, the measurement range is centered at F0 (=synchronous detection frequency F1) defined by the system, or is indicated by:

$$F0(=F1) \pm (1/10) \times (Ft)$$

where Ft is the transmission rate.

By contrast, in the invention, in accordance with the measurement range of the frequency error detector, the judging section 3 previously calculates the upper limit value, the lower limit value, a synchronous detection frequency (F1') in the case where the input rough frequency is lower than the lower limit value, a synchronous detection frequency (F1") in the case where the frequency is higher than the upper limit value, and a synchronous detection frequency (F1'") in the case where the frequency is between the upper and lower limit values. The rough frequency F of the input modulation signal (A) which is obtained by the frequency spectrum analyzer 2 is provided with a certain width. Therefore, the rough frequency F is subjected to judgement with respect to the criterion values, and one of the frequencies (F1'), (F1"), and (F1'") is output as the synchronous detection frequency (B)

When one of the frequencies (F1'), (F1"), and (F1'") is used as the synchronous detection frequency, the measurement range is centered at (F1'), (F1"), or (F1'"), or (F1'±α), (F1"±α), or (F1'"±α) where α=(1/10)×(Ft).

Figure 2B:
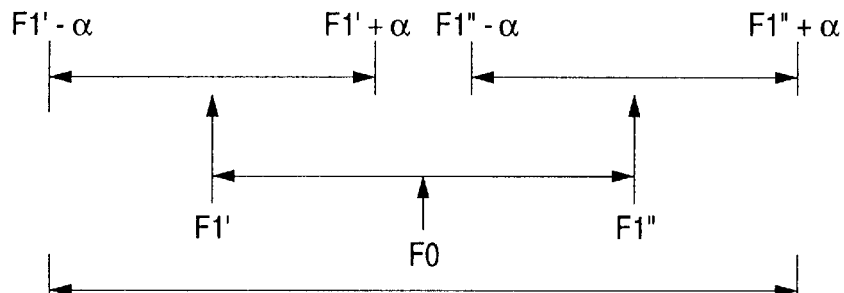
FIG. 2B is a diagram illustrating the principle of widening of the measurement range of the invention.

In the invention, as shown in FIG. 2B, the measurement range can be therefore made wider than that of the conventional art in which F0 defined by the system is used as the synchronous detection frequency F1.

As described above, in the frequency error measuring device 1 of the embodiment, the deviation of the frequency which is roughly obtained by the frequency spectrum analyzer 2, and the correct frequency error from the synchronous frequency and obtained by the frequency error detector 6 are added to each other, whereby the measurement range of a frequency error can be widened.

As described above, the invention can attain the following effects:

1. In the invention, a rough frequency of an input modulation signal which is to be measured is obtained by frequency spectrum analyzing means; a predetermined synchronous detection frequency is determined on the basis of the rough frequency; a difference between the synchronous detection frequency and a reference signal is obtained; an I signal and a Q signal are obtained by performing synchronous detection by using the synchronous detection frequency; a frequency error is obtained from the I component and the Q component by a phase trajectory method; and the frequency error is added to the difference, whereby a final frequency error value is obtained. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (first aspect of the invention).

2. In the invention, a rough frequency of an input modulation signal which is to be measured is obtained by frequency spectrum analyzing means; the rough frequency is compared with predetermined upper and lower limit values, and one of plural predetermined synchronous detection frequencies is determined on the basis of a result of the comparison; a difference between the synchronous detection frequency and a reference signal is obtained; an I signal and a Q signal are obtained by performing synchronous detection by using the synchronous detection frequency; a frequency error is obtained from the I component and the Q component by a phase trajectory method; and the frequency error is added to the difference to obtain a final frequency error value. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (second aspect of the invention).

3. In the invention, a rough frequency of an input modulation signal which is to be measured is obtained by frequency spectrum analyzing means; the rough frequency is compared with predetermined upper and lower limit values, and one of plural predetermined synchronous detection frequencies is determined on the basis of a result of the comparison; an I signal and a Q signal are obtained by performing synchronous detection by using a sampling data and the synchronous detection frequency, the sampling data being obtained by sampling the modulation signal; a phase data is calculated from the I component and the Q component, and a frequency error is obtained by a phase trajectory method; a difference between the synchronous detection frequency and a reference signal is obtained; and the frequency error is added to the difference, thereby obtaining a final frequency error value. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (third aspect of the invention).

4. In the invention, a rough frequency of an input modulation signal which is to be measured is obtained by frequency spectrum analyzing means; a range in which the rough frequency exists is judged with respect to predetermined upper and lower limit values, a synchronous detection frequency in the case where the frequency is lower than the lower limit value is determined, a synchronous detection frequency in the case where the frequency is higher than the upper limit value is determined, or a synchronous detection frequency in the case where the frequency is between the upper and lower limit values is determined; detection is performed by using a sampling data and the synchronous detection frequency, at a timing of the synchronous detection, thereby obtaining an I signal and a Q signal of the synchronous-detected input signal, the sampling data being obtained by sampling the modulation signal; a phase data is extracted from the I component and the Q component by an atan (arctangent) calculation, and then subjected to a predetermined normalization process, and a frequency error is thereafter obtained by a phase trajectory method from a difference between the phase data and an ideal phase shift point; a difference between the synchronous detection frequency and a reference signal is obtained; and the frequency error is added to the difference, thereby obtaining a final frequency error value. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (fourth aspect of the invention).

5. In the invention, also in the case where the frequency spectrum analyzing means is a sweeping spectrum analyzer, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (fifth aspect of the invention).

6. In the invention, also in the case where the frequency spectrum analyzing means is an FFT spectrum analyzer, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (sixth aspect of the invention).

7. In the invention, also in the case where the input modulation signal which is to be measured is a π/4-shift QPSK modulation signal, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (seventh aspect of the invention).

8. The device of the invention is configured by: a frequency spectrum analyzer which obtains a rough frequency of an input modulation signal which is to be measured; a judging section which determines one of plural predetermined synchronous detection frequencies on the basis of the rough frequency; an adder which obtains a difference between the synchronous detection frequency and a reference signal; a quasi-synchronous detector which performs synchronous detection by using the synchronous detection frequency to output an I signal and a Q signal; a frequency error detector which obtains a frequency error from the I component and the Q component by a phase trajectory method; and an adder which adds the frequency error and the difference. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (eighth aspect of the invention).

9. The device of the invention is configured by: a frequency spectrum analyzer which obtains a rough frequency of an input modulation signal which is to be measured; a judging section which performs judgment on the rough frequency to determine a frequency that is to be subjected to synchronous detection; a sampling data memory which stores the modulation signal to be measured; a quasi-synchronous detector which performs synchronous detection on the modulation signal which is to be measured, by using the frequency which is determined by the judging section; a frequency error detector which calculates phase data from components of the synchronous-detected signal, and which obtains a frequency error from a phase difference between the phase data by a phase trajectory method; and an adder which obtains a difference between the synchronous-detected frequency and a reference frequency, and which adds a measurement result of the frequency error detector to the difference. Therefore, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (ninth aspect of the invention).

10. The device of the invention is configured by: a frequency spectrum analyzer which obtains a rough frequency of an input modulation signal which is to be measured; a judging section which compares the rough frequency with predetermined upper and lower limit values, and which determines one of plural synchronous detection frequencies on the basis of a result of the comparison; an adder which calculates a difference between the frequency and a reference signal; a quasi-synchronous detector which performs synchronous detection by using the synchronous detection frequency to output an I signal and a Q signal; a frequency error detector which obtains a frequency error from the I component and the Q component by a phase trajectory method; and an adder which adds the frequency error and the difference. Therefore, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (tenth aspect of the invention).

11. The device of the invention is configured by: a frequency spectrum analyzer which obtains a rough frequency of an input modulation signal which is to be measured; a judging section which compares the rough frequency with predetermined upper and lower limit values, and which determines one of plural synchronous detection frequencies on the basis of a result of the comparison; an adder which calculates a difference between the synchronous detection frequency and a reference signal; a quasi-synchronous detector which performs synchronous detection by using a sampling data and the synchronous detection frequency to output an I signal and a Q signal, the sampling data being obtained by sampling the modulation signal; a frequency error detector which calculates a phase data from the I component and the Q component, and which obtains a frequency error (E) by a phase trajectory method; and an adder which adds the frequency error and the difference. Therefore, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (twelfth aspect of the invention).

12. The device of the invention is configured by: a frequency spectrum analyzer which obtains a rough frequency of an input modulation signal which is to be measured; a judging section which judges a range in which the rough frequency exists, with respect to predetermined upper and lower limit values, and which determines a synchronous detection frequency in the case where the frequency is lower than the lower limit value, a synchronous detection frequency in the case where the frequency is higher than the upper limit value, or a synchronous detection frequency in the case where the frequency is between the upper and lower limit values; an adder which obtains a difference between the synchronous detection frequency and a reference signal; a quasi-synchronous detector which performs synchronous detection by using a sampling data and the synchronous detection frequency, at a timing of the synchronous detection, and which outputs an I signal and a Q signal of the synchronous-detected signal, the sampling data being obtained by sampling the modulation signal; a frequency error detector which extracts a phase data from the I component and the Q component by an atan (arctangent) calculation, which performs a predetermined normalization process, and obtains a frequency error by a phase trajectory method from a difference between the phase data and an ideal phase shift point; and an adder which adds the frequency error to the difference. Therefore, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (fourteenth aspect of the invention).

13. In the invention, also in the case where the device further comprises a sampling data memory which stores the modulation signal to be measured, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (eleventh, thirteenth, and fifteenth aspects of the invention).

14. In the invention, also in the case where the input modulation signal which is to be measured is a π/4-shift QPSK modulation signal, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (sixteenth aspect of the invention).

15. In the invention, also in the case where the frequency spectrum analyzer is configured by a sweeping spectrum analyzer, the measurement range of the frequency error measuring device which originally has a frequency error measurement range that is about $\frac{1}{10}$ of the transmission rate can be widened while maintaining the measurement accuracy, by obtaining a rough frequency by using a frequency spectrum analyzer, performing synchronous detection, and then using a frequency error detector (seventeenth aspect of the invention).

16. In the invention, also in the case where the frequency spectrum analyzer is configured by an FFT spectrum analyzer, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector (eighteenth aspect of the invention).

17. In a frequency error detector of the conventional art and using the phase trajectory method, only a frequency error corresponding to about 1/10 of the transmission rate about the local frequency to be subjected to synchronous detection can be obtained at the maximum. By contrast, in the frequency error measuring device which performs synchronous detection on signal components contained in an input modulation signal to be measured, calculates a phase data from the synchronous-detected signal components, detects a phase difference between the phase data, and obtains a frequency error by the phase trajectory method, the frequency of the input modulation signal is roughly obtained in advance by a frequency spectrum analyzer 2, and the local frequency can be changed to a range where a measurement by the phase trajectory method is enabled. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector.

18. In the invention, the frequency of an input modulation signal is roughly obtained by a frequency spectrum analyzer 2, and the frequency result is supplied to a judging section 3. The frequency B of synchronous detection is determined by a judging circuit included in a frequency detector. By using the synchronous detection frequency B which is determined by the judging section 3, synchronous detection is performed on a modulation signal A which is to be measured and which is input into a quasi-synchronous detector 5, and I and Q components D are output. Then, the I and Q components D are input into a frequency error detector 6. In the frequency error detector 6, phase components are extracted, and a frequency error E is obtained by the phase trajectory method. In an adder 8, the obtained frequency error E is added to the difference between the synchronous detection frequency B which is determined by the judging section 3, and a reference frequency, thereby obtaining the correct frequency error of the modulation signal A to be measured. Therefore, the measurement range of the frequency error measuring device which originally has a frequency error measurement range that is about 1/10 of the transmission rate can be widened while maintaining the measurement accuracy, by obtaining a rough frequency by using a frequency spectrum analyzer, performing synchronous detection, and then using a frequency error detector.

19. In the invention, the rough synchronous detection frequency B can be rapidly obtained by the frequency spectrum analyzer 2 (first to eighteenth aspects of the invention).

What is claimed is:

1. A frequency error measuring method comprising:
    calculating a rough frequency of an input modulation signal to be measured using frequency spectrum analyzing means;
    determining a predetermined synchronous detection frequency on the basis of the rough frequency;
    calculating a difference between the synchronous detection frequency and a reference signal;
    performing synchronous detection by using the synchronous detection frequency to calculate an I signal component and a Q signal component;
    calculating a frequency error from the I signal component and the Q signal component by a phase trajectory method; and
    adding the frequency error to the difference to obtain a final frequency error value.

2. The frequency error measuring method according to claim 1, wherein the frequency spectrum analyzing means is a sweeping spectrum analyzer.

3. The frequency error measuring method according to claim 1, wherein the frequency spectrum analyzing means is an FTT spectrum analyzer.

4. The frequency error measuring method according to claim 1, wherein the input modulation signal which is to be measured is a π/4-shift QPSK modulation signal.

5. The frequency error measuring method according to claim 2 wherein the input modulation signal which is to be measured is a π/4-shift QPSK modulation signal.

6. The frequency error measuring method according to claim 3 wherein the input modulation signal which is to be measured is a π/4-shift QPSK modulation signal.

7. A frequency error measuring method comprising:
    calculating a rough frequency of an input modulation signal to be measured by frequency spectrum analyzing means;
    comparing the rough frequency with predetermined upper and lower limit values;
    determining one of a plurality of predetermined synchronous detection frequencies on the basis of a result of the comparison;
    calculating a difference between the one of the predetermined synchronous detection frequencies and a reference signal;
    performing synchronous detection by using the one of the plurality of predetermined synchronous detection frequencies to calculate an I signal component and a Q signal component;
    calculating a frequency error from the I signal component and the Q signal component by a phase trajectory method; and
    adding the frequency error to the difference to obtain a final frequency error value.

8. The frequency error measuring method according to claim 2 wherein the input modulation signal which is to be measured is a π/4-shift QPSK modulation signal.

9. A frequency error measuring method comprising:
    calculating a rough frequency of an input modulation signal to be measured by frequency spectrum analyzing means;
    comparing the rough frequency with predetermined upper and lower limit values; determining one of plural predetermined synchronous detection frequencies on the basis of a result of the comparison;
    performing synchronous detection by using a sampling data and the synchronous detection frequency to calculate an I signal component and a Q signal component, the sampling data being obtained by sampling the modulation signal, calculating a phase data from the I signal component and the Q signal component obtaining a frequency error by a phase trajectory method;

obtaining a difference between the synchronous detection frequency and a reference signal; and adding the frequency error to the difference, thereby obtaining a final frequency error value.

10. The frequency error measuring method according to claim 9 wherein the input modulation signal which is to be measured is a π/4-shift QPSK modulation signal.

11. A frequency error measuring method comprising:

calculating a rough frequency of an input modulation signal to be measured by frequency spectrum analyzing means;

judging a range where the rough frequency exists with respect to predetermined upper and lower limit values;

determining a synchronous detection frequency in the case where the frequency is lower than the lower limit value;

determining a synchronous detection frequency in the case where the frequency is higher than the upper limit value;

determining a synchronous detection frequency in the case where the frequency is between the upper and lower limit values;

performing a detection by using a sampling data and the synchronous detection frequency, at a timing of the synchronous detection, to obtain an I signal component and a Q signal component of the synchronous-detection frequency the sampling data being obtained by sampling the modulation signal;

extracting a phase data from the I signal component and the Q signal component by an arctangent calculation;

performing a predetermined normalization process;

obtaining a frequency error by a phase trajectory method from a difference between the phase data and an ideal phase shift point;

calculating a difference between the synchronous detection frequency and a reference signal; and adding the frequency error to the difference between the synchronous detection frequency and the reference signal to obtain a final frequency error value.

12. The frequency error measuring method according to claim 11 wherein the input modulation signal which is to be measured is a π/4-shift QPSK modulation signal.

13. A frequency error measuring device comprising:

a frequency spectrum analyzer for obtaining a rough frequency of an input modulation signal to be measured;

a judging section for determining one of a plurality of predetermined synchronous detection frequencies on the basis of the rough frequency;

a first adder for obtaining a difference between the synchronous detection frequency and a reference signal;

a quasi-synchronous detector for performing synchronous detection by using the synchronous detection frequency to output an I signal component and a Q signal component;

a frequency error detector for obtaining a frequency error from the I signal component and the Q signal component by a phase trajectory method; and a second adder for adding the frequency error and the difference.

14. The frequency error measuring device according to claim 13, wherein the input modulation signal to be measured is a π/4-shift QPSK modulation signal.

15. The frequency error measuring device according to claim 13, wherein the frequency spectrum analyzer is a sweeping spectrum analyzer.

16. The frequency error measuring device according to claim 13, wherein the frequency spectrum analyzer is an FFT spectrum analyzer.

17. A frequency error measuring device comprising:

a frequency spectrum analyzer for obtaining a rough frequency of an input modulation signal to be measured;

a judging section for performing judgment on the rough frequency to determine a frequency to be subjected to synchronous detection;

a sampling data memory for storing the modulation signal to be measured;

a quasi-synchronous detector for performing synchronous detection on the modulation signal to be measured, by using the frequency determined by the judging section;

a frequency error detector for calculating phase data from components of the synchronous-detected signal, the frequency error detector for obtaining a frequency error from a phase difference between the phase data by a phase trajectory method; and a first adder for obtaining a difference between the frequency subjected to the synchronous-detection and a reference frequency, a second adder for adding a measurement result of the frequency error detector to the difference.

18. A frequency error measuring device comprising:

a frequency spectrum analyzer for obtaining a rough frequency of an input modulation signal to be measured;

a judging section for comparing the rough frequency with predetermined upper and lower limit values, the judging section for determining one of a plurality of synchronous detection frequencies on the basis of a result of the comparison;

a first adder for calculating a difference between the one of the synchronous detection frequencies and a reference signal;

a quasi-synchronous detector for performing synchronous detection by using the one of the synchronous detection frequencies to output an I signal component and a Q signal component;

a frequency error detector for obtaining a frequency error from the I signal component and the Q signal component by a phase trajectory method; and a second adder for adding the frequency error and the difference.

19. A frequency error measuring device according to claim 18 further comprising a sampling data memory which stores the modulation signal to be measured.

20. A frequency error measuring device comprising:

a frequency spectrum analyzer for calculating a rough frequency of an input modulation signal which is to be measured;

a judging section for comparing the rough frequency with predetermined upper and lower limit values, and which determines one of plural synchronous detection frequencies on the basis of a result of the comparison;

a first adder for calculating a difference between the one of the synchronous detection frequencies and a reference signal;

a quasi-synchronous detector for performing synchronous detection by using a sampling data and the one of the synchronous detection frequencies to output an I signal component and a Q signal component, the sampling data being obtained by sampling the modulation signal;

a frequency error detector for calculating a phase data from the I signal component and the Q signal component, the frequency error detector for obtaining a frequency error (E) by a phase trajectory method; and a second adder for adding the frequency error and the difference.

21. The frequency error measuring device according to claim 20, wherein the device further comprises a sampling data memory for storing the modulation signal to be measured.

22. A frequency error measuring device comprising:

a frequency spectrum analyzer which obtains a rough frequency of an input modulation signal which is to be measured;

a judging section for judging a range where the rough frequency exists, with respect to predetermined upper and lower limit values, the judging section for determining a synchronous detection frequency in the case where the frequency is lower than the lower limit value, a synchronous detection frequency in the case where the frequency is higher than the upper limit value, and a synchronous detection frequency in the case where the frequency is between the upper and lower limit values;

a first adder for obtaining a difference between the synchronous detection frequency and a reference signal;

a quasi-synchronous detector for performing synchronous detection by using a sampling data and the synchronous detection frequency, at a timing of the synchronous detection, the quasi-synchronous detector for outputting an I signal component and a Q signal component of the synchronous-detected frequency, the sampling data being obtained by sampling the modulation signal;

a frequency error detector for extracting a phase data from the I signal component and the Q signal component by an arctangent calculation, the frequency error detector for performing a predetermined normalization process, the frequency error detector for obtaining a frequency error by a phase trajectory method from a difference between the phase data and an ideal phase shift point; and a second adder for adding the frequency error to the difference.

23. The frequency error measuring device according to claim 22 further comprising a sampling data memory for storing the modulation signal to be measured.

* * * * *